2 Sheets—Sheet 1.

M. POND.

Cooking Range.

No. 240.

Reissued June 7, 1853.

N. PETERS, Photo-Lithographer, Washington, D. C.

M. POND.

2 Sheets—Sheet 2.

Cooking Range.

No. 240.

Reissued June 7, 1853.

N. PETERS, Photo-Lithographer, Washington, D. C.

UNITED STATES PATENT OFFICE.

MOSES POND, OF BOSTON, MASSACHUSETTS.

IMPROVEMENT IN COOKING-RANGES.

Specification forming part of Letters Patent No. 7,946, dated February 25, 1851; Reissue No. 240, dated June 7, 1853.

*To all whom it may concern:*

Be it known that I, MOSES POND, of Boston, in the county of Suffolk and State of Massachusetts, have invented certain new and useful Improvements in the Cooking-Range; and I do hereby declare that the same are fully described and represented in the following specification and the accompanying drawing, letters, figures, and references thereof.

Figure 1:
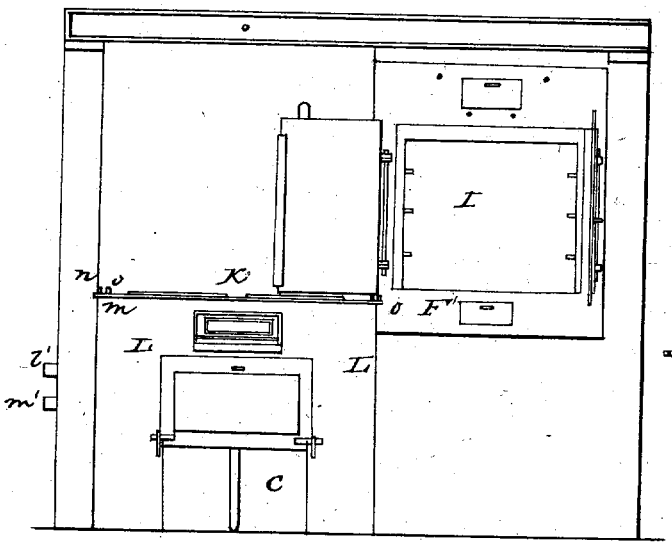
Figure 2:
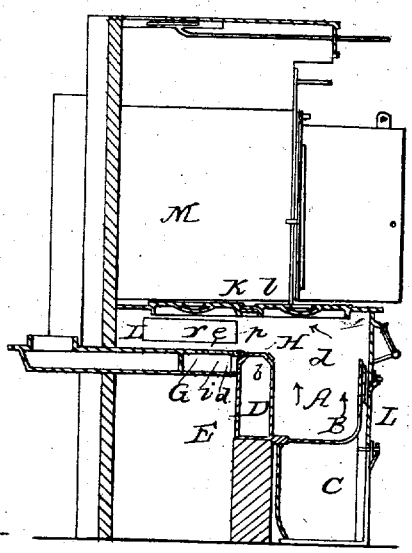
Figure 3:
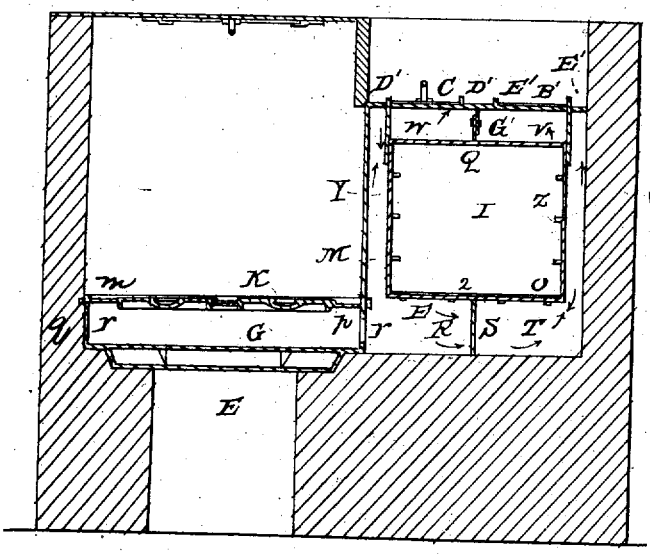
Figure 4:
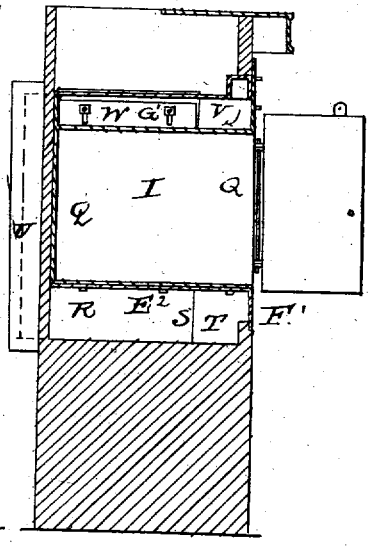
Figure 5:
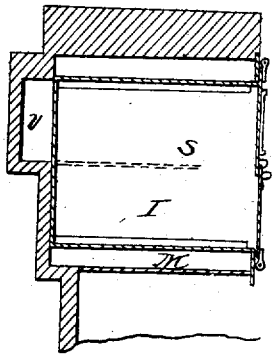
Figure 6:
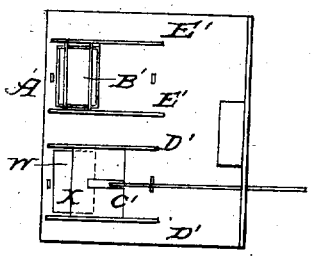
Figure 7:
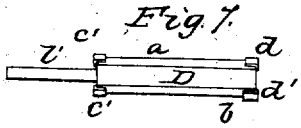
Figure 8:
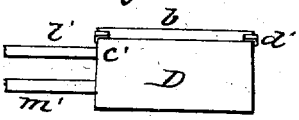
Figure 9:
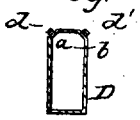
Figure 10:
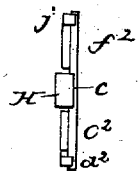
Figure 11:
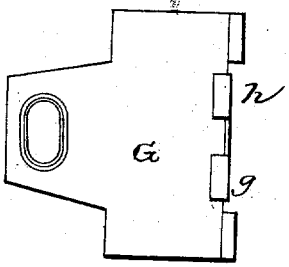
Figure 12:
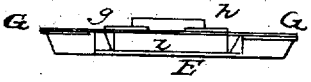
Figure 13:
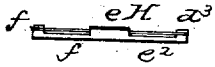
Figure 14:
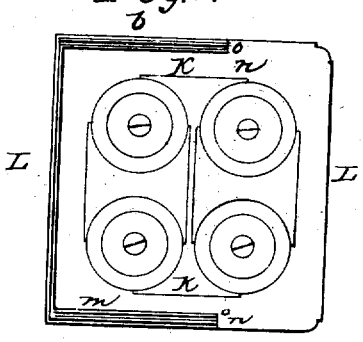
Figure 15:
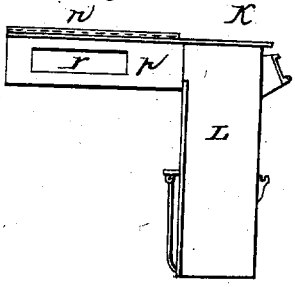
Figure 16:
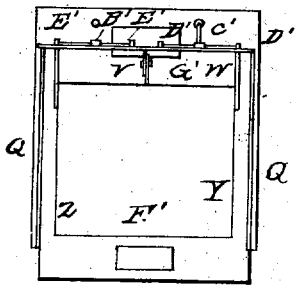

Of the said drawings, Figure 1 represents a front elevation of my improved cooking-range. Fig. 2 is a vertical transverse section of it as taken through the fire-place or fire-grate and the hot-water back or chamber, which is disposed directly in rear of the fire-place. Fig. 3 is a vertical and longitudinal section taken through the oven and the boiling-chamber; Fig. 4, a transverse and vertical section taken through the oven, and in such manner as to exhibit the flue-partitions both underneath and above it. Fig. 5 is a horizontal section taken through the middle of the oven. Fig. 6 is a top view of the damper-plate over the oven. Fig. 7 is a top view of the hot-water back or chamber. Fig. 8 is a side view of said hot-water back or chamber. Fig. 9 is a cross-section of said hot-water back or chamber. Fig. 10 is a top view of the connecting piece or plate by which the water-back is connected with the hot-air plate, or plate which constitutes the top plate of the hot-air flue. Fig. 11 is a top view of the said top plate of the said hot-air flue. Fig. 12 is a front edge view of the said top plate. Fig. 13 is a rear edge view or elevation of the connecting-piece. Fig. 14 is a top view of the boiler-plate, or that plate of the range which is situated directly over and parallel to the aforesaid top plate of the said hot-air flue. Fig. 15 is a side elevation of the cast-iron fire-place frame. Fig. 16 is a back elevation of the oven-flue frame.

In the said drawings, A represents the furnace or fire-place, of which B is the grate, and C the ash-pit; D, the hot-water back, placed directly in rear of and forming, in part, the boundary of the fire-place. Directly in rear of the hot-water back is a hot-air chamber, E, into which the cold air is to be admitted in any convenient manner, and out of which it is to be conducted by a flue-space, F, extending directly under the plate G, with which the hot-water back is to be connected by the connecting-piece H, to be hereinafter described. The top or upper part of the hot-water back is made beveling, as seen at *a b* in Figs. 2, 7, 8, and 9. The extremity of each beveled part is provided with a small tip or projection, *c d* or *c′ d′*, such projection being made to extend over and parallel with the beveled surface to which it is applied, and to receive between it and the said beveled surface one end of the connecting plate or piece H, which is placed directly upon said beveled surface, and is held thereto by the projection above mentioned. From the top surface of said connecting-piece three or any other suitable number of plates, $d^2$ *e f*, are made to extend horizontally and to lap or rest upon the top surface of the plate G. From the under surface of the upper part of the said connecting-piece two or any other suitable number of projections, $e^2 f^2$, are made to extend under the plate G, the said plates or projections $e^2 f^2$ being arranged between those before described as projecting from the top surface of the connecting-piece. Similar projections, *g h*, extend from the upper surface of the plate G. There is also a similar one, *i*, extended from the lower surface of said plate and between them on its top surface. The several projections of the top surface of the plate G, when said plate is carried up against the connecting-piece, overlap the connecting-piece and extend between the projections on its top surface; the projections on the under side of the connecting-piece underlap the plate G, while the projection from the under side of the plate G underlaps the connecting-piece, the said projections of said connecting piece and plate being made so to interlock with each other as to overlap or underlap the joint or line of contact between the connecting-piece and the plate G, so as to closely break or cover said joint.

By inspection of the drawings of the hot-water back it will be perceived that it has two pipes, *l′ m′*, entering one end of it, the said pipes being usually cast in one piece with the water-back. Now, as it is often desirable in setting up a range to be able to change or reverse the water-back, or to so arrange it that the pipes will pass out of it in a direction either to the right or to the left, or from one or the other end of it, I have provided the water-back with the connecting-plate and connections, by which it may be reversed or turned around end for end at pleasure, as circumstances may require. It might be thought that the plate G could be cast with an inclined flange to rest against the beveled part of the water-back and to lock under the projections of such beveled part, and thus entirely dispense with the connecting-piece and interlocking projections of it, and the plate G; but were this the case it will readily be seen that in order to remove a water-back at any time for the purpose of substituting another, should the first be injured by the fire or cracked by freezing of the water therein, (a very common occurrence,) it will become necessary to move it downward and backward, and that this would involve the necessity of not only cutting away the brick-work directly under it or on what it rests, as well as that in rear of its ends or against which they rest. The cutting away of such brick-work is not only extremely difficult to be effected, but necessarily occasions a great waste of time and labor, both in the cutting away and reparation of it. With my improved connecting-piece no depression of the water-back is necessary in order to remove it, nor is necessary any cutting away or destruction of the brick-work on which its bottom part rests. It may be removed forward and horizontally, and so as to carry with it the connecting-piece or separate it from the plate G. Again, should we dispense with the connecting-piece and cast overlapping and underlapping projections on one side only of the water-back, such as are cast on the connecting-piece, it will be readily seen that we can only use the said water-back in one direction—that is to say, that it would not be reversible, as above stated; consequently, from the above it will be seen that the connecting-piece becomes essential as far as convenience and a saving of labor, time, and expense is concerned.

In the drawings, I represents the oven as placed above and on the right of the fire-place.

In Fig. 14 it will be seen that the plate K, which constitutes the top plate of the cast-iron fire-place frame L, is made not only with a large recess, *l*, along one edge of it, but also another and similar recess, *m*, along its opposite edge, each of said recesses being formed by two projections or flanges, *n o*, made to extend vertically from the top surface of the plate and parallel to one another, and at a distance apart equal to the thickness of the oven side flue-plate M, the bottom of which is to be placed and made to rest on either of the said recesses, according to the position in which the oven is placed, either on the right or left of the fire-place. If the oven is placed on the right of the fire-place, the flue-plate M is so diposed on the left of the oven. If, on the contrary, the oven be placed on the left of the fire-place, the flue-plate M must be disposed on the right of the oven, it being attached in any convenien tmanner to the oven-supporting and flue frame Q. Extending down from both sides of the plate of the fire-place frame are two flue-plates, *p q*, through the rear part of each of which a flue-opening or passage, *r*, is made. Then it will be seen that a fire-place frame is provided with two flue-openings, the object of the same being to enable the oven to be arranged on either side of or to the right hand or left of the fire-place, as circumstances may require. Besides this, should it be desirable, it will be seen that such applications of two recesses and two flue-opening plates admit of two ovens being used in connection with the fire-place, one of the said ovens being placed on the right hand of it, while the other is arranged on the left of it.

I now propose to describe the arrangement of flues by which the smoke and heat are made to circulate around the oven. After passing from the fire-place and through the openings of the fire-place frame, the smoke enters the flue-space R, situated directly under the left part of the oven. Thence it passes forward and circulates around the front end of a partition-plate, S, placed directly under the oven; hence passes backward through a flue, T, situated under and against the oven, and into a vertical flue, U, which is carried upward against the rear end or side of the oven; thence into a horizontal flue, V, carried over the surface of the oven and to the front thereof; thence into another horizontal flue, W, which extends rearward over the oven and from the front to the back part thereof; thence through the damper-opening X, and thence into the discharge-pipe or chimney. Out of the flue which carries the heat around the oven radiating-spaces Y Z are carried in such manner as to allow the heat to circulate from the flues against the upright sides of the oven, as well as against that portion of the back of the oven against which the flues are not carried or against which they do not directly act, it being usually customary to leave a very narrow space between the brick-work and the back plate of the oven. This space, however, forms no part of my invention. The top plate of the oven-frame I make with two openings, X A′, which lead, respectively, out of the flues W V. A cover, B′, is fitted to one of these openings, while a sliding damper, C′, is adapted to the other. Both openings are to be made of the same size, and so that either the cover or the damper may be applied or fitted to either of them, as the case may require, each being provided with a set of parallel guides, D′ D′ or E′ E′, to guide the movements of the damper when applied to it. When the oven is placed on the right side of the fire-place, the damper is applied to the opening X and the cover-plate to the opening A′; but when the oven is placed on the opposite side of the fire-place, the damper is applied to the opening A′ and the cover-plate to the opening X.

The oven is a rectangular box made to slide in or out of the frame by which it is supported. It is made, generally speaking, of sheet-iron, and has its bottom plate stiffened by a fixed plate, $E^2$, of cast-iron, placed underneath it and riveted to it. This plate does not extend quite to the front edge of the bottom plate of the oven, but is made to terminate a short distance therefrom, and so as to allow the said bottom plate, when the oven is in place, to rest on the bottom of the opening of the frame or plate F′.

In order to move the oven, it becomes necessary to raise it upward a little before it can be drawn out of the frame by which it is supported; so, in order to admit of its being raised up, the partition which divides the flue V from the flue W has a sliding plate, G′, affixed to it by means of such contrivances as will not only hold it against the partitions, but admit of its being raised or lowered, or allowed to slide freely up or down, and to drop down by its own weight and rest upon the top of the oven, so as to make a close joint when the oven is in place. On raising up the oven in order to remove it, the plate G′ will readily rise upward with it and admit of its being removed. It also permits the oven to be readily inserted in place, and by dropping down upon the oven prevents the smoke from passing from one flue, V, under the partition and into the other flue, W. The regular flue-passages around the oven are carried in contact with the bottom part thereof, one-half or a portion of the back part thereof, and the top thereof. They in no respects are intended to lead the smoke and volatile products of combustion against the sides of the oven, such side of the oven being heated by the heat that passes from underneath the oven and into the flues or spaces which are made directly against the said sides of the oven.

What I claim as my invention is—

1. The improvements by which the hot-water back is connected with the plate G, and by means of which said hot-water back may be either readily removed at any time or applied in such manner that the directions of its water-pipes may be disposed so as accommodate the bath-boiler, into which they are usually led, on whatever side of the range the said bath-boiler may be placed, the said improvements consisting, first, in the connecting-piece H and the attachments of it and the hot-water back, the whole being made to operate together substantially in the manner as above set forth; second, in a second set of attachments, (fixed on the opposite face of the water-back,) in combination with the first set thereof, as described.

2. The peculiar arrangement of flues which lead the smoke and volatile products of combustion directly around the oven, the said arrangement of flues causing the heat to course against a portion or one half of the bottom of the oven, next into another flue, which takes it backward and against the other portion or half of the bottom of the oven, thence up a flue against the oven, thence through a flue extending over and against a portion or half of the top of the oven, thence into and through another flue, which carries it backward and over and against the top of the oven and conveys it to the chimney or discharge-flue, not meaning to include in such arrangement the radiating chamber or space Y Z, hereinbefore mentioned.

3. The two recesses *l m* and two flue-plates, *p q*, applied to the plate K, in combination with the two valve-openings X A′, their damper and cover-plate, as applied to the top plate of the oven-frame and used under an arrangement of oven-flues substantially as described, the same allowing of the adaptation of the oven to either side of the fire-place, or the use of two such ovens and their frames in connection with the fire-place, all essentially as hereinbefore stated.

4. The improvement by which the oven can be raised and readily removed, and by which the smoke is prevented from passing underneath the partition which separates the flues on top of the oven, the same consisting in the sliding or gravitating plate G′, affixed to the partition, and made to operate substantially in the manner as specified.

In testimony whereof I have hereto set my signature this 3d day of May, A. D. 1853.

MOSES POND.

Witnesses:

R. H. EDDY,

R. B. SHERBURNE.